Patented Aug. 22, 1950

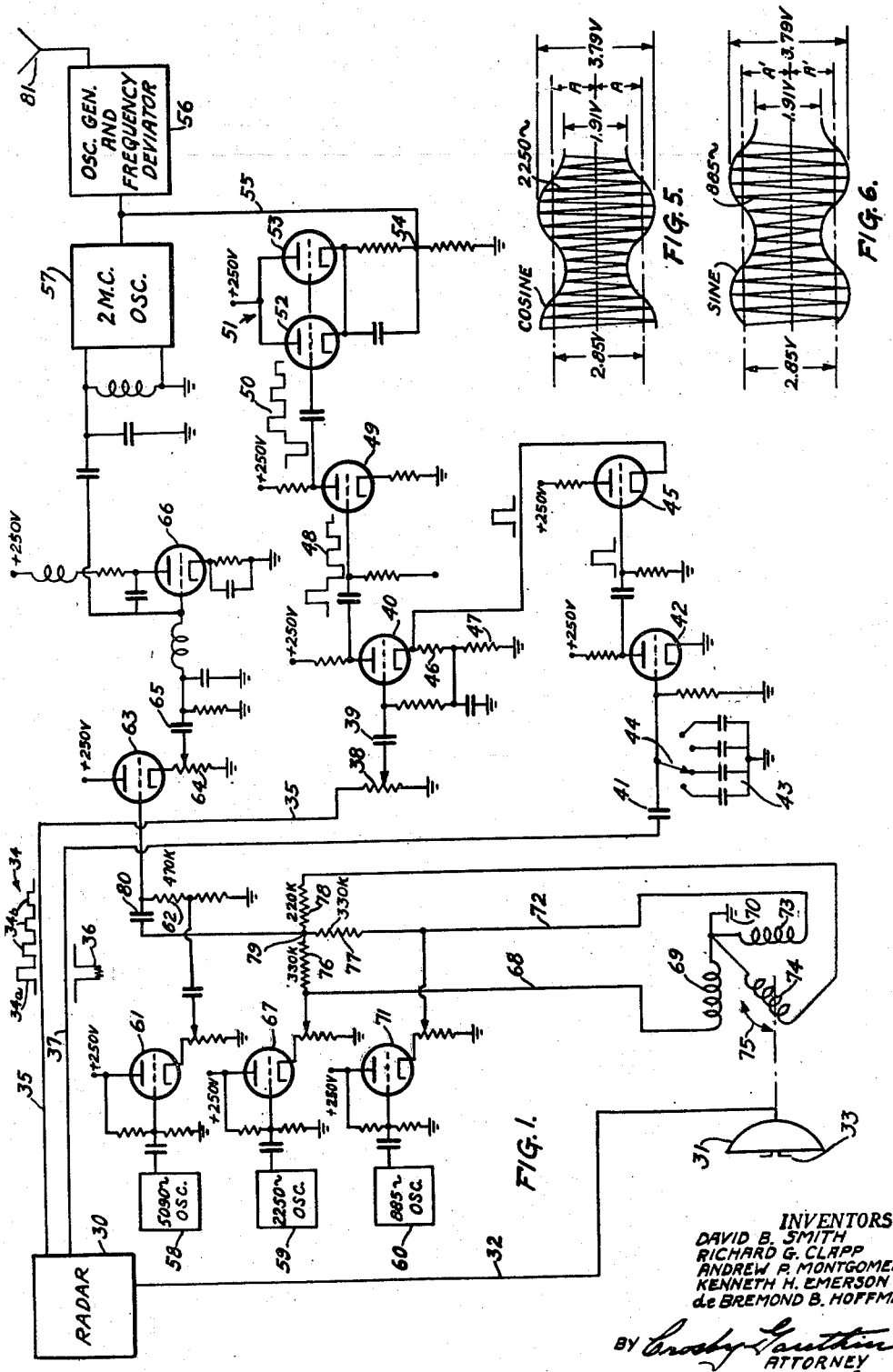

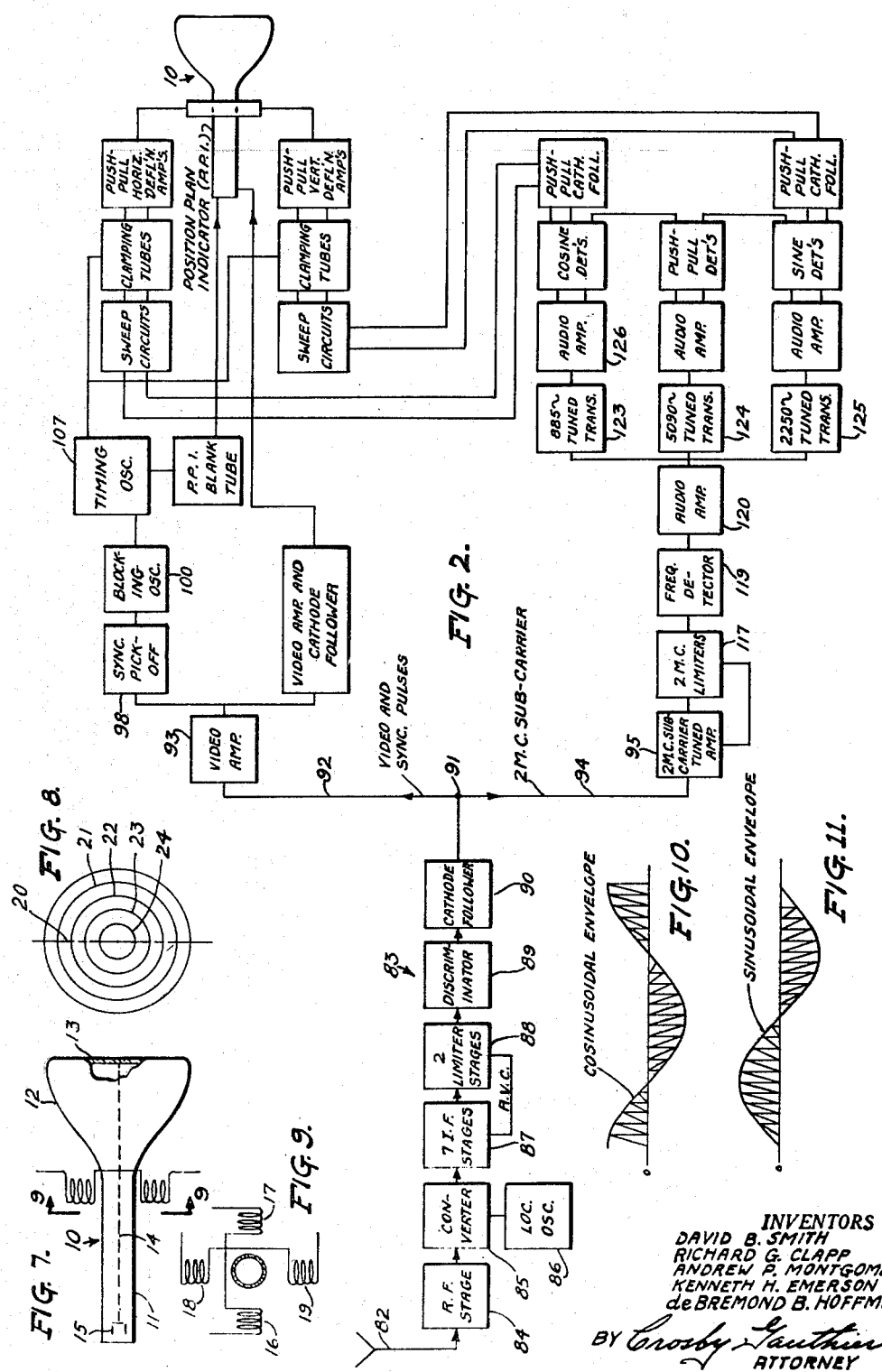

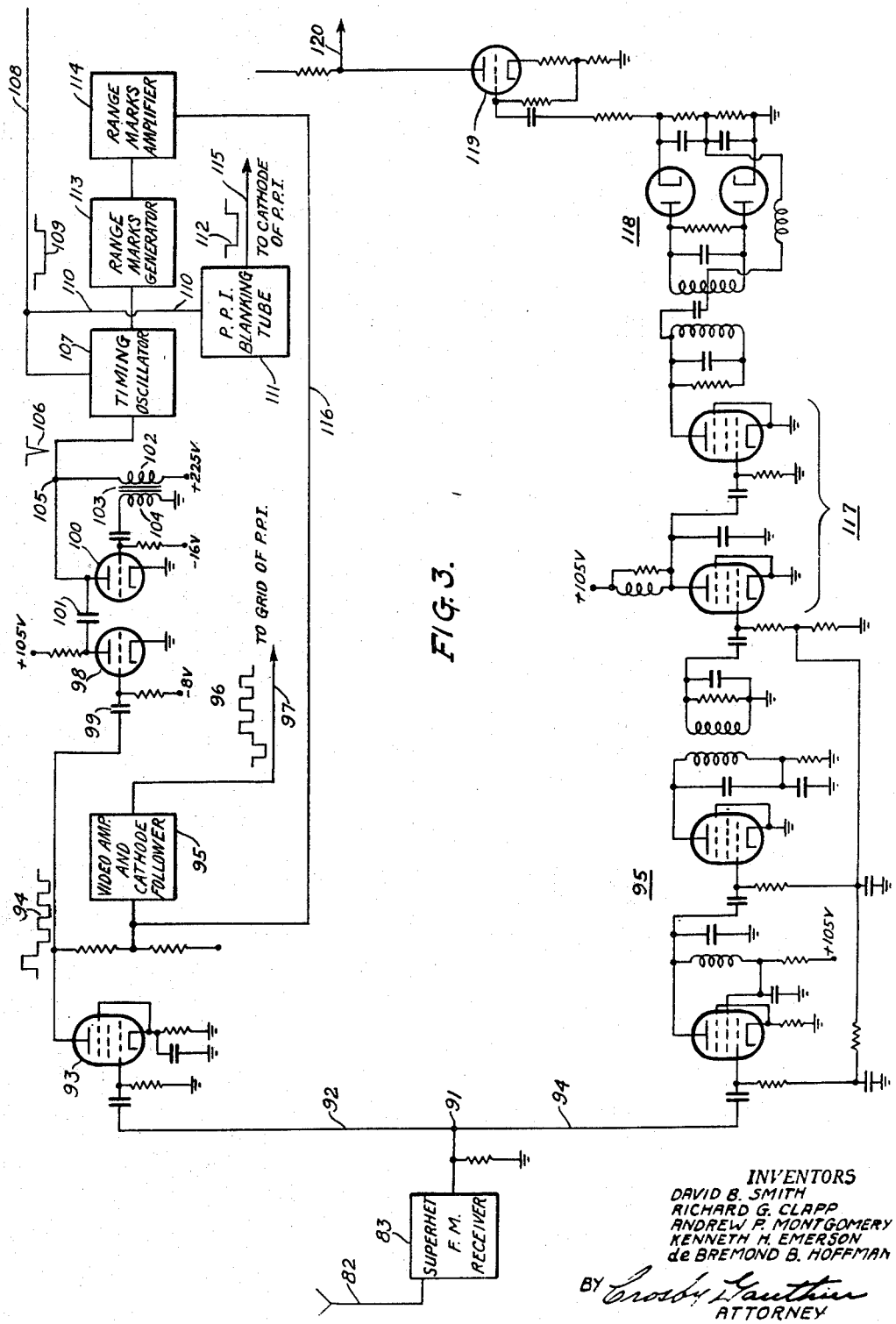

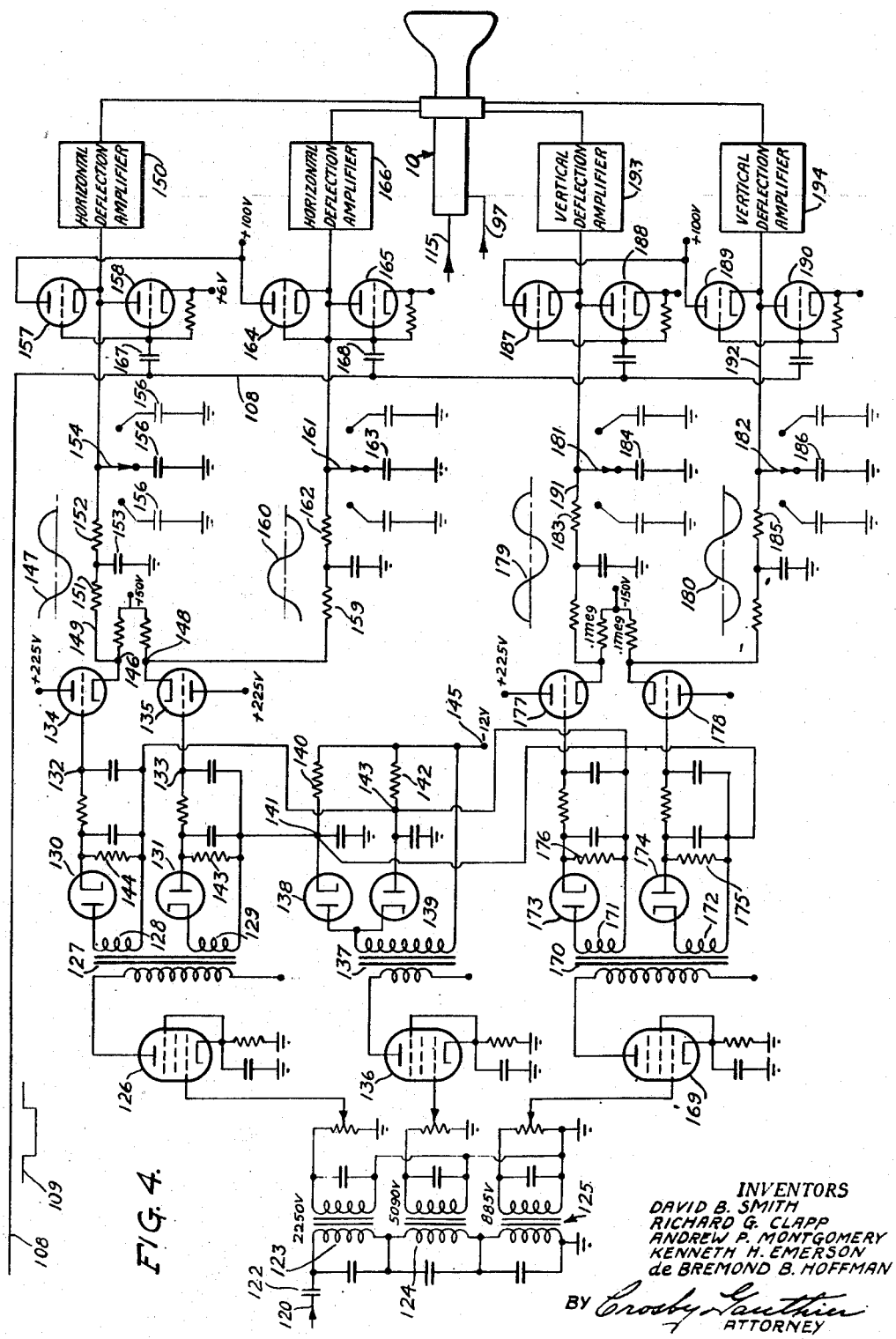

2,519,935

UNITED STATES PATENT OFFICE 2,519,935

ELECTRICAL SYSTEM FOR THE TRANSMISSION OF ANGULAR OR AZIMUTHAL INTELLIGENCE

David B. Smith, Flourtown, Richard G. Clapp, Haverford, Andrew P. Montgomery, Narberth, and Kenneth H. Emerson and De Bremond B. Hoffman, Philadelphia, Pa., assignors, by mesne assignments, to Philco Corporation, Philadelphia, Pa., a corporation of Pennsylvania Application August 14, 1945, Serial No. 610,854

6 Claims. (Cl. 343—6)

This invention has to do with the art of effecting and maintaining synchronism between widely separated instrumentalities, and relates, more specifically, to radar link systems.

A "radar link system" is one which, for example, enables a radar receiver located on the ground or on shipboard to reproduce on its oscilloscope screen the same field pattern as simultaneously appears on the "scope" of a radar carried by an airplane with which the ground or shipboard radar receiver is in communication. The purpose is to enable the skipper of the ship or commanding officer at the ground station, or other persons properly concerned, to see what the plane radar is picking up. Manifestly, such a link system can be usefully employed, not only between plane and ship or plane and ground, but between any two stations as, for instance, two ships or a ship and ground station or between two or more ground stations or two or more planes.

An entire system such as herein described comprises two major parts, namely: (1) the radar equipment which scans the scene and relays the picture information, and which is herein denominated the "transmitter unit" and (2) the radar equipment to which the picture information is relayed from the transmitter unit and which reproduces the same visually—the latter equipment being herein denominated the "receiver unit."

In order to avoid possible misunderstanding it should be noted that the part of the equipment herein designated "transmitter unit" also includes radar receiving equipment—which, however, does not form a part of what is herein referred to as the "receiver unit."

In any radar system wherein the projected radio beam is movable relatively to the viewing screen (as in scanning the scene) it is necessary to provide means for synchronizing the azimuthal angle of the cathode beam with that of the radio beam so that the visible indications (spots) on the scope will accord in azimuth with the reflecting bodies forming parts of the scanned scene—which visible indications correspond respectively to the various reflecting bodies and constitute the intelligence which the scope pattern is intended to convey. It is a relatively simple matter to synchronize the cathode beam of the receiver oscilloscope with the radio beam in an ordinary radar installation; but, in a radar link system wherein the "scope" at the receiver can be co-ordinated with the transmitter scanning beam only through the space medium, synchronization has proved to be a difficult matter. The problem has been to find an effective and not too complicated way of transmitting, via radio, intelligence which will continuously and automatically deflect the cathode beam at the receiving end of the link system so that its angular position (azimuth) always corresponds to that of the scanning beam at the transmitting end. The present invention is directed to the solution of that problem.

An important feature of this invention resides in the method and means herein described by which there are produced at the receiving end of the system, under control of the transmitting end, two alternating voltages which are always mutually related as the sine and cosine of the angle of azimuth of the radar scanning beam. This feature is characterized in that there are generated at the transmitting end of the radar link two A. C. voltages (preferably low frequency) which are amplitude modulated in conformity with the sine and cosine, respectively, of the azimuthal angle of rotation of the radar scanning spinner; and there is also generated at the transmitter end an additional A. C. voltage (preferably low frequency) which is not modulated but which is maintained constantly in fixed amplitude relation to average value of the aforementioned modulated waves. According to the preferred practice these three low frequency waves are employed to modulate a sub-carrier which in turn is utilized to modulate a high frequency carrier wave which is transmitted and then detected at the receiving end of the system to reproduce the aforementioned three low frequency waves. At the receiver the two modulated waves are utilized to produce, respectively, two waves both of which coincide in frequency with the rotation of the spinner and are at all times mutually related as the sine and cosine of the angle of rotation of the radar beam.

In order to transmit sine and cosine waves which can be reproduced as such at the receiving end, it is expedient to amplitude modulate two low frequency waves of mutually different frequencies in such manner that their respective envelopes do not pass through zero and are mutually in phase quadrature; but in detecting such a wave form to take out the sine and cosine waves it was found that any signal strength variations which might obtain would cause certain grid bias variations at the receiver, which, in turn, prevented satisfactory operation of the system. This invention provides an effective solution of this difficulty in that there is transmitted along with the two modulated low frequency waves the aforementioned third unmodulated low frequency wave which is used at the receiving end to produce a D. C. voltage which is employed to cancel out the D. C. components of the voltages resulting from rectification of the two modulated low frequency waves.

Additional features of this invention will be pointed out or will become apparent as the detailed description progresses.

Referring to the drawings which accompany this specification:

Fig. 1 is a diagram of a transmitter unit, including conventional radar equipment together with supplemental provisions for establishing a radar link in accordance with the invention;

Fig. 2 is a block diagram of a receiver unit for use in cooperation with the transmitter unit of Fig. 1;

Fig. 3 is a diagram of a portion of the receiver unit of Fig. 2 showing some of the circuit connections in detail;

Fig. 4 is a diagram of another portion of the receiver unit of Fig. 2 likewise showing some of the circuit connections in detail;

Fig. 5 is a diagram illustrating modulation of a low frequency wave in accordance with an envelope of cosinuscidal form;

Fig. 6 is a diagram illustrating modulation of another low frequency wave in accordance with an envelope of sinusoidal form;

Fig. 7 is a diagrammatic showing of a position-plan-indicator (cathode ray tube) in elevation;

Fig. 8 is a view of the face of the cathode ray tube of Fig. 7;

Fig. 9 is a cross sectional view taken along the line 9—9 of Fig. 7;

Fig. 10 is a diagrammatic illustration of a series of sawtooth pulses which are utilized to activate one pair of the deflecting coils associated with the cathode ray tube of Figs. 7–9; and Fig. 11 is a diagrammatic illustration similar to Fig. 10 showing the series of sawtooth pulses used to activate the other pair of deflecting coils.

In order fully to comprehend this invention it is necessary to understand the general principles of radar (which term is a contraction of "radio detection and ranging system") and especially that form of radar which is used continuously to scan a large surrounding land or ocean area and which visually reproduces upon its viewing screen all objects (e. g. ships, etc.) within the scanned area which are capable of reflecting the scanning radio beam.

The scanning beam is of very high radio frequency and is concentrated into beam form by means of a reflector, just as light is concentrated into a beam by means of a light reflector. It consists, not of a continuous flow of radiant energy, but, instead, of a stream of recurrent bursts of energy, each of very short duration, but long enough to include a considerable number of cycles of the very high radio frequency employed. Each such burst is followed by a pause long enough to permit it to travel the maximum intended range and then to return to the starting point, in case it encounters a wave reflecting body at the outermost limit of the intended range. The spacing of the recurrent burst of high frequency wave energy is, therefore, determined primarily by the maximum intended range and by the speed at which the projected and reflected waves travel through space—which speed is the same as that of light.

The returning reflected waves are picked up, usually by the same antenna as that which projects the beam, and are utilized to produce visible indicia by means of which the locations of the various reflecting bodies within the scanned area can immediately be determined. The instrument employed to produce the aforesaid visible indicia is a cathode ray tube, similar to the receiving tubes used in television.

In some instances the radar beam may be projected continuously in one direction, or it may be caused to sweep a small arc. On the other hand, the beam may be caused continuously or periodically to sweep a complete circle; and such is often the case where the radar is carried by an observation plane. In considering the present invention, it may be assumed, for purposes of description, but not by way of limitation, that the beam reflector is arranged to rotate through a complete circle so as to scan a large circular area extending in all directions from the observing plane.

For the benefit of those who are not at all familiar with radar technique, there is illustrated in Figs. 7–9 a cathode ray tube which is capable of producing on its screen an accurate small scale plat of the scanned area, including luminous indicia (light spots) corresponding to all wave reflecting bodies within said area—all such indicia being positioned on the screen in accurate correspondence to the real objects which they represent. The center of the screen (see Fig. 8) corresponds to the position of the radar equipment; which is to say, the position of the observing plane which carries the radar equipment. The cathode ray tube comprises an evacuated glass envelope 10 consisting of a rather long tubular stem terminating in an enlarged bulbous portion 12, the front face 13 of which is thinly coated interiorly with a phosphor which, when excited by electronic bombardment of sufficient intensity will fluoresce and thus produce visible light which persists as long as the bombardment continues, and thereafter for a short period of time.

In Fig. 7 the dotted line 14 represents a cathode beam, which is a very thin pencil-like stream of electrons projected from a so-called electron-gun 15 and normally directed at the center of screen 13.

The operation of any cathode ray tube such as that under consideration is dependent upon the fact that the cathode beam is capable of being laterally deflected when appropriately subjected to the influence of either a magnetic field or an electrostatic field. We prefer to utilize magnetic deflection; but electrostatic deflection can readily be substituted and will produce like results. Both methods of deflecting a cathode beam are well known and can usually be substituted one for the other.

In Fig. 9, which is a cross sectional view, there are shown, diagrammatically, two pairs of deflecting coils arranged in quadrature and disposed symmetrically about the neck of the tube. The pair comprising coils 16 and 17 operate conjointly to produce a magnetic field the lines of which extend horizontally through the neck of the tube. The other pair comprising coils 18 and 19 operate conjointly to produce a second magnetic field the lines of which extend vertically through the neck of the tube. If coils 16 and 17 are energized by current flowing therethrough, the resultant horizontal magnetic field will cause the cathode beam to be deflected vertically—either upwardly or downwardly from center, depending upon the direction of current flow through the coils; and a reversal of the current direction will cause a corresponding reversal of the direction in which the beam is deflected. The amplitude of beam deflection is a direct function of the strength of the magnetic field and thus of the magnitude of the current. It follows that if an alternating voltage is applied to coils 16, 17 the cathode beam will be deflected alternately up and down from center along the vertical path represented by line 20 in Fig. 8. The function of coils 18 and 19 is precisely the same as that of coils 16 and 17, except that they cause the beam to be deflected horizontally instead of vertically.

For the moment we will disregard the presence of coils 18 and 19 and we will assume, merely to facilitate comprehension, that the cathode beam is being continuously deflected upwardly from center along line 20 and back to center, (which can be done by means of a half-wave deflecting voltage instead of full-wave) and we will make the further assumption that the beam is normally of such low intensity that it produces on the screen either a very faintly visible radial trace or no luminescence at all. Then, at some instant when the beam is directed at a point along line 20 other than center, let us assume that the tube is suddenly activated by an incoming signal pulse which causes the intensity of the cathode beam to increase abruptly. The result will be a luminous spot appearing on the screen, and its radial distance from the center of the screen will correspond to the distance or range of some object which is capable of reflecting radio waves. If it be postulated that the radial deflection velocity of the beam is so chosen that the radial distance from the center of the screen to the peripheral edge corresponds to a radar range of 30 miles, for example, then, if the aforementioned luminous spot is situated midway between the center and the periphery of the screen, it follows that the reflecting object is 15 miles away.

If the radar beam reflector were fixedly pointed in a given direction instead of being arranged to rotate and thus scan a circular area, the luminous indicia would always appear along line 20, at one side of center only, and never elsewhere on the screen. But we are here dealing with radar equipment in which the reflector is arranged to rotate, either through an arc or a complete circle, and consequently the cathode beam deflecting means must be such that the radial trace of the beam will rotate about the center of the screen whereby to bring about production of luminous spots or areas on all parts of the screen in correspondence with reflecting objects located in various parts of the circular or sectorial area being scanned.

Let it be supposed now that coils 16 and 17 are being energized by a sine wave of very low frequency corresponding to the frequency of rotation of the radar beam reflector; and let it be further supposed that coils 18 and 19 are being energized by a cosine wave of the same frequency and same amplitude as the sine wave. Sine and cosine waves have a phase difference of 90°, and the combined result of the two beam deflecting forces is to cause the cathode beam to trace a circular path on screen 13—said path being concentric with the screen and having a radius dependent upon the strength of the current energizing the deflection coils. Obviously, such an arrangement is not sufficient to enable production of luminous indicia on all parts of the screen area, for the simple reason that the beam impinges only upon an area of the fluorescent screen defined by a circular line.

If instead of energizing coils 16, 17 with a simple low frequency sine wave, and coils 18, 19 with a simple cosine wave, there are impressed upon coils 16, 17 a rapidly recurring series of sawtooth voltages having a sinusoidal low frequency envelope, as depicted in Fig. 11, and upon coils 18, 19 a similar series of sawtooth voltages having a cosinusoidal envelope, as depicted in Fig. 10, the cathode beam will be deflected radially at a rapidly recurring rate, away from and back to the center of the screen, while at the same time it traces the aforementioned circular path. Thus there will be produced on the screen a trace comparable to a single wheel spoke which is continuously rotating. Since the radar reflector is usually arranged to rotate approximately 30 revolutions per minute, the spoke-like trace of the cathode beam will likewise rotate at that speed. Now it will be apparent that the radial cathode beam trace may be made always to proceed from the center of the screen in a direction which corresponds at every instant to the direction in which the radar reflector is pointed—provided the cosine and sine envelopes depicted in Figs. 10 and 11 are synchronized with the rotation of the radar beam projector. With such an arrangement the entire screen area, (Fig. 8) is scanned by the cathode beam about 30 times per minute—that is to say, once for each complete revolution of the radar scanning beam.

In order to enable the operator to judge the range of any object appearing on the screen, it is customary to produce on the screen a series of concentric rings 21, 22, 23, 24, so spaced as to be indicative of various range distances. But since the radar can be adjusted so that the distance from center to the periphery of the screen may represent any of a plurality of different ranges, the circular range lines cannot conveniently be located at fixed radial distances from the center. For that reason it is the practice to produce the range lines by means of the cathode beam. If each time the cathode beam reaches a certain predetermined radial distance from the center of the screen, it is activated by means of a suitable pulse, it will produce a luminous spot on the screen, and those spots collectively, will form a series of luminous circles such as 21—24, Fig. 8. The pulses essential to the production of the circular range lines are obtained from a range mark generator indicated in block form in Fig. 3.

The above description of the mode of operation of a radar cathode ray receiving tube is in accordance with conventional prior art practice where the radio beam reflector and the cathode ray tube are situated at the same station and can be interconnected metallically, that is to say, without interposition of a radio link. The present invention has to do with a different situation wherein the cathode ray tube with which we are primarily concerned is remote from the radar beam projector and can be coupled therewith only through the medium of radio. The principal problem arises from the fact that the deflection of the cathode beam must be able to follow the rotation of the distant projector through an angle of azimuth greater than one quadrant. If the scanning were restricted to a single quadrant the problem would be materially simplified.

In the system of Figs. 1–4, to be described hereinafter, the cathode ray tube illustrated in Figs.

7-9 is known as a "Position-Plan-Indicator" or "P. P. I."; and the radio beam projector is commonly referred to as a "spinner."

Referring to Fig. 1, which illustrates a complete transmitter unit in accordance with this invention, block 30 represents a conventional prior art radar system—which is to be regarded as also including the radio beam-forming projector or "spinner" 31. The radar equipment is operative to generate recurrent bursts of very high frequency wave energy which are transmitted via a wave guide or co-axial line 32 to a dipole antenna 33, from which said bursts of energy are propagated into space in the form of a beam. Each such burst usually has a duration of about one or two microseconds and is followed by a pause of perhaps one thousand microseconds. Since the radio frequency employed may be as high as several thousand megacycles, it will be apparent that each burst may comprise several thousand cycles. A single burst of wave energy as above described is often referred to as a "main bang"—which is an accurately descriptive term. It will be employed in this specification.

During each of the aforementioned pauses the radar is in condition to respond to any and all reflections of the immediately preceding main bang received via antenna 33, and such received reflections constitute what are called video signals. The return time of a video signal, following the main bang, of which it is a reflection, is a function of the range of the object which gave rise to the reflection; and each such video signal activates the beam of the P. P. I. tube, as previously described, and thus produces a luminous spot on the screen thereof at a position which corresponds to the position of the reflecting object in relation to the radar scanning equipment.

The regular radar equipment, represented by block 30 and spinner 31, plus all the additional equipment indicated diagrammatically in Fig. 1 is herein referred to, in its entirety, as the "transmitter unit," in order to distinguish the same from the equipment of Figs. 2, 3, and 4—which latter is referred to, in its entirety, as the "receiver unit."

It may be assumed that the equipment of Fig. 1 is mounted on and carried by an observation plane and that, in operation, spinner 31 is directed horizontally, as shown or slightly tilted down, and is continuously revolving so that the projected radio beam sweeps a large circular area on the ground or water below.

The output of radar 30 (exclusive of the main bang output of antenna 33) consists of two parts, namely: video signals 34, which emerge via conductor 35, and synchronizing pulses (sync) 36, which emerge via conductor 37. These are approximately rectangular pulses containing a residue of higher frequencies—which higher frequencies are objectionable in the sync pulses. Each series of video signals 34 includes a pulse 34a, which corresponds to the main bang, followed by one or more pulses 34b, which latter are the result of reflections of the main bang received by antenna 33. Pulses 34a are not wanted but are present notwithstanding and have to be suppressed, as will presently be explained. The video reflection pulses 34b are spaced at random corresponding to the random spacing of the reflecting bodies; and, of course, there may be a large or small number of such pulses following a main bang, or there may be none at all, depending upon the number of reflecting bodies encountered. The function of each sync pulse 36 is to initiate, at the receiver, a radial sweep of the cathode beam of the P. P. I. That is to say, each sync pulse signals the start of two sawtooth voltages as per Figs. 10 and 11 previously described.

The video voltage pulses 34 (including 34a and 34b) are impressed via potentiometer 38 and grid condenser 39 upon the grid of a video amplifier triode 40. Simultaneously with the arrival of a main bang pulse 34a at the grid of triode 40, there is impressed, via condenser 41 upon the grid of a triode 42, the coincident negative sync pulse 36. The latter contains a fringe of higher frequency, as shown, and the function of triode 42 is to slip off such fringes and at the same time amplify the sync pulses. There is provided a group of condensers 43, of various capacities, and a selector switch 44 by means of which any selected one of condensers 43 can be connected in series with condenser 41. This constitutes a variable capacitive voltage divider permitting regulation of the sync pulse voltage impressed on triode 42.

The output of triode 42 is a positive pulse from which the higher frequency fringe has been eliminated; and this is impressed upon the grid of a blanking tube 45. The cathode of tube 45 is connected to ground through a pair of series resistors 46, 47 which are also in series with the cathode of triode 40. The output of tube 45 is a positive pulse coincident in time with a positive pulse 34a on the grid of triode 40. The positive potential thus impressed on the cathode of triode 40 by tube 45 serves to blank triode 40 and thus prevent transmission of the unwanted pulse 34a. But the blanking of said triode is immediately removed upon cessation of the blanking pulse and triode 40 is then in readiness to pass the wanted video pulses. The blanking of triode 40 gives rise to a large positive pulse at its plate, corresponding in duration to the positive blanking pulse; but the video pulses are of negative polarity at the plate of triode 40. The combined output of triode 40 is shown at 48 and consists of a large positive sync pulse followed by a series of negative video pulses. This, it will be observed, is a wave form in which sync pulses are distinguished from video pulses by their respective polarities.

Following video amplifier 40 is a second amplifier 49, the output of which is reversed in polarity, as indicated at 50. This is succeeded by a cathode follower 51 comprising two parallel triodes 52, 53. Voltage corresponding in form to that indicated at 50 is taken from the cathode follower at 54 and applied via conductor 55 to the frequency deviator of a frequency modulated oscillation generator 56. In an actual case this generator has a center frequency of 102 mc. and is deviated a maximum of ±4 mc. by the modulating signals. The video deviates the carrier in the plus frequency direction while the sync deviates it in the minus frequency direction.

In addition to the frequency modulation effected by the sync and video pulses, the 102 mc. output of oscillation generator 56 is also frequency modulated by a 2 mc. sub-carrier produced by an oscillator 57, which latter is in turn modulated in the manner now to be described.

At 58, 59 and 60 are indicated three temperature-controlled low frequency oscillation generators operating respectively at 5090 cycles, 2250 cycles and 885 cycles. The 5090 cycle output of oscillator 58 is fed through a cathode follower 61 and resistor 62 to the grid of a second cathode follower 63. The resultant 5090 cycle voltage appearing across cathode resistor 64 is impressed via coupling condenser 65 upon the grid of a frequency deviator tube 66. The latter with the network shown constitutes a frequency modulator utilizing the Miller effect and is operative to modulate the 2 mc. sub-carrier output of oscillator 57. It follows that the sub-carrier is continuously modulated by a constant amplitude 5090 cycle wave, the function of which will appear later. Any of the better known frequency deviators could be employed instead of that shown.

It is further desired to modulate the 2 mc. carrier with the two waves illustrated in Figs. 5 and 6 respectively—one of which has a frequency of 2250 cycles amplitude modulated at a very low frequency, while the other has a frequency of 885 cycles modulated by the same low frequency. The low frequency is that of the frequency of rotation of spinner 31—say 30 cycles per minute—and the two modulation envelopes (Figs. 5 and 6) are quadrature related. Each half of the envelope of Fig. 5 is represented as a cosine wave, while each half of the envelope of Fig. 6 is represented as a sine wave. The reason for transmitting the two modulated waves illustrated by Figs. 5 and 6 is to enable production at the distant receiver of sine and cosine low frequency voltages. As will later appear the 5090 cycle unmodulated wave is utilized at the receiver to produce positive and negative D. C. voltages which are employed to cancel biases A and A' (Figs. 5 and 6), thus shifting the positive or negative zero axis potentials of the 30 cycle sine and cosine waves to ground potential, after rectification.

It would be possible to produce these biasing potentials at the receiving end, but by having them originate at the transmitting end of the system it is possible to maintain equality between the voltage to be cancelled and the cancelling voltage—which is vitally important.

The 2250 cycle output of oscillator 59 is fed through a cathode follower 67 and, via conductor 68, to one terminal of a stator coil 69, the other terminal of which is grounded at 70.

The 885 cycle output of oscillator 60 is fed through a cathode follower 71 and, via conductor 72, to one terminal of a second stator coil 73. Stator coils 69 and 73 are disposed in quadrature in inductive relation to a rotor coil 74. The latter is mechanically coupled with spinner 31 and rotates therewith as indicated by the doubleheaded arrow 75. Its angle of rotation always corresponds to that of the spinner. Stator coil 69 induces across rotor coil 74 a 2250 cycle voltage which varies in amplitude between zero and a certain maximum value. Similarly, stator coil 73 induces across rotor coil 74 an 885 cycle voltage which varies in amplitude between zero and the same certain maximum value. In order to produce the two waves illustrated by Figs. 5 and 6 it is necessary to add to the 2250 cycle voltage of coil 74 an unmodulated 2250 cycle voltage, and to add to the 885 cycle voltage of coil 74 an unmodulated 885 cycle voltage. The manner in which this is accomplished will now be explained. Let it be assumed that the maximum coupling between coil 69 and coil 74 is such that there is a voltage step-down of 3:1 from coil 69 to coil 74, and that there is a like coupling and step-down ratio from coil 73 to coil 74. Let it be further assumed that the 2250 cycle potential across coil 69 is 10 volts, and that the 885 cycle potential across coil 73 is also 10 volts. It will be observed that there is across coil 69 a resistance voltage divider comprising a 330,000 ohm resistor 76 in series with two parallel resistors 77 and 78 having values of 330,000 and 220,000 ohms respectively Parallel resistors 77 and 78 are equivalent to a single resistance of 132,000 ohms. Hence the voltage to ground at junction 79 is 28.5% of the total voltage across the voltage divider. This means that when the coupling between coil 69 and coil 74 is zero the 2250 cycle potential to ground at junction 79 will be 28.5% of 10 volts or 2.85 volts. When the coupling between coil 69 and coil 74 is maximum aiding, the potential at 79 will be 2.85 volts plus 28.5% of 3.3 volts (2.85+.94) or 3.79 volts. When the coupling between coils 69 and 74 is maximum opposing, the potential at 79 will be 2.85—.94 volts or 1.91 volts. The same is true with respect to the 885 cycle potential at junction 79. The above voltages are all indicated on Figs. 5 and 6.

The two modulated waves of Figs. 5 and 6, respectively, are impressed via coupling condenser 80 upon the grid of cathode follower 63, together with the unmodulated 5090 cycle wave from oscillation generator 58, and, in turn, are impressed upon the grid of reactance tube 66 which functions as a frequency deviator. Manifestly, the 2 mc. sub-carrier output of oscillator 57 is frequency modulated simultaneously at 5090 cycles, 2250 cycles and 885 cycles, the latter two being modulated at low frequency as per Figs. 5 and 6. The 102 mc. output of oscillation generator 56 is frequency modulated by the modulated 2 mc. sub-carrier and also by the sync and video pulses from terminal 54 of cathode follower 53. The modulated output of oscillator 56 is radiated by antenna 81, which may be directional or nondirectional.

Resistors 62, 76, 77 and 78 serve to isolate cathode followers 61, 67 and 71 from one another to such extent that the several cathode resistors will not effectively shunt each other. Thus, the voltage output of each said cathode follower can be adjusted without materially influencing the voltage output of either of the others.

Referring now to the block diagram, Fig. 2, the receiver unit comprises a receiving antenna 82 coupled to the input end of a superheterodyne FM receiver 83 (see also Fig. 3) which comprises the several elements 84 to 90 inclusive, all of which are appropriately labeled. The output of cathode follower 90 (Fig. 2) is the modulated 2 mc. sub-carrier previously described, together with the video and sync pulses as illustrated at 50, Fig. 1.

From junction 91 the video and sync pulses follow a course which includes conductor 92 and video amplifier 93, whereas the 2 mc. modulated carrier follows another course which includes conductor 94 and a tuned amplifier 95.

We will now consider how the sync and video signal output of amplifier 93 is utilized to initiate the successive radial deflections of the cathode beam of the P. P. I. tube and to activate said beam so as to produce luminous spots on the P. P. I screen corresponding to the video pulses. A combined sync and video signal appearing at the plate of amplifier 93 is shown at 94, Fig. 3. This comprises a positive sync pulse followed by a series of negative video pulses. Connected to the output of amplifier 93 and indicated in block form is a video amplifier and cathode follower 95, the output of which is indicated, as to form, at 96. Here the sync pulse is negative and the video pulses are positive. Conductor 97 leads to the grid of the P. P. I tube (see Fig. 4) which is normally biased to cut-off or nearly so, and consequently the negative sync pulse has no effect except to further increase the negative grid bias; but the positive video pulses which follow each sync pulse render the grid correspondingly less negative and thus activate the cathode beam, giving it strength enough to produce a luminous spot corresponding to each video pulse.

A sync pick-off tube 98 has its grid connected via coupling condenser 99 to the plate of amplifier 93. This tube is effective only in response to the positive sync pulses to trigger a blocking tube oscillator 100. The video pulses have no effect on the sync pick-off tube 98 except to render the grid thereof more negative, which does not serve to trigger the blocking tube oscillator. When a positive sync pulse is applied to the grid of tube 98, the plate of that tube goes correspondingly negative. This potential decrease is transmitted by condenser 101 to the plate of tube 100, and this gives rise to a flow of current through primary 102 of transformer 103, which renders positive the grid terminal of secondary winding 104. Making the grid positive causes an increase of plate current through tube 100, thus increasing the current through primary 102. The total effect is a rapid building up of space current through tube 100, which continues to the point of tube saturation, whereupon the change of current through primary 102 is abruptly ended and the grid returns to a potential below cut-off. The resultant voltage change at junction 105 is represented at 106 and constitutes a large negative pulse of short duration. Pulses 106 coincide in time with the corresponding sync pulses and are used to trigger a timing oscillator 107, which, preferably, is a multivibrator. The latter puts out via conductor 108 negative rectangular pulses as indicated at 109, each such pulse starting contemporaneously with a pulse 106. The timing oscillator is adjustable to vary the duration of pulses 109—which duration determines the time required for the P. P. I. cathode beam to complete one radial sweep outwardly from the center, as will later be explained.

Pulses 109 are also transmitted via conductor 110 to a P. P. I. blanking tube 111, which is a cathode follower, the output of which is a negative rectangular pulse 112 of the same duration as pulse 109 but not necessarily of the same amplitude. The normal bias potential of the P. P. I. cathode supplied by blanking tube 111 via conductor 115 is of such value as to blank the P. P. I. and the blanking is continuous except for the successive periods coincident with pulses 112. It will be understood that the application of a negative bias to the P. P. I. cathode removes the blanking, whereas it requires positive potential on the P. P. I. grid to activate the cathode beam. The reason for blanking the P. P. I. is to prevent activation of the cathode beam during its return to the center of the screen following each outward radial sweep. If this were not done video pulses coming in during the return sweeps would produce improperly positioned luminous spots on the screen.

The range marks generator 113 and range marks amplifier 114, (Fig. 3) are conventional radar equipment. The generator is triggered by pulses from the timing oscillator and, in response to each trigger pulse, puts out a series of range mark pulses which are fed via conductor 116 to the input side of video amplifier 95. Each such pulse produces a spot on the screen and these are so spaced that, collectively, they produce on the screen a series of luminous rings, such as rings 21—24, Fig. 8. As previously explained, these rings serve as a measure of the range of objects indicated on the screen. For want of space, the range marks generator and amplifier have been omitted from Fig. 2.

The 2 mc. modulated sub-carrier output of tuned amplifier 95 is passed through a two-stage limiter 117, which is followed by a frequency detector 118 of the Seeley type such as described in U. S. Patent 2,121,103. The output of detector 118 is the aforementioned 5090 cycle unmodulated wave together with the 2250 cycle modulated wave and 885 cycle modulated wave shown in Figs. 5 and 6. Those three components are passed through an audio amplifier 119 and thence via conductor 120 and blocking condenser 122 to the primaries of three tuned transformers 123, 124 and 125 which constitute a filter for separating the three low frequency waves. Transformer 123 is tuned to 2250 cycles and thus passes only the cosine-modulated wave depicted in Fig. 5. Transformer 124 is tuned to 5090 cycles and thus passes only the unmodulated wave of that frequency generated by oscillator 56. Transformer 125 is tuned to 885 cycles and thus passes only the sine-modulated wave depicted in Fig. 6.

The output of transformer 123 is passed via audio amplifier 126 to the primary of a push-pull transformer 127 having two secondary windings 128 and 129 which are included in circuit respectively with two diode detectors 130 and 131. These may be referred to as the cosine detectors. Their outputs at terminals 132 and 133 are low frequency cosine waves of mutually opposite phase, from which the 2250 cycle components have been filtered out by the filter network shown.

Terminals 132 and 133 are connected respectively to the grids of two cathode follower tubes 134 and 135, which grids have a fixed negative bias of —12 volts as indicated at terminal 145. It is important that those grid biases be stable; that is to say, that the only potential variations on the grids of said tubes be those which result from the low frequency cosine waves. But the potential at 132 developed by the rectified 2250 cycle signal includes not only the cosine wave but, in addition, a D. C. component, as will be apparent from inspection of Fig. 5. This would be immaterial if the D. C. component could be depended upon to be of constant magnitude; but it cannot because it will vary with any variation of the average amplitude of the 2250 cycle signal. Hence, in the absence of the provision to the contrary about to be described, the bias on the grids of tubes 134 and 135 would not be constant.

In order to neutralize the D. C. potential variations at 132 and 133, it is necessary to introduce counteracting D. C. potentials which vary in step therewith; and that is the function of the unmodulated 5090 cycle wave. Since the latter is generated at the transmitting end of the system and its amplitude is maintained there at a constant ratio to that of the 2250 cycle wave, and the two are carried by the same 2 mc. subcarrier, any amplitude variations in the one, at the receiving end, will also be present in the other. Thus, it will be seen, it is possible to utilize the 5090 cycle wave to generate the needed counteracting D. C. potential.

The 5090 cycle output of tuned transformer 124 is passed via an audio amplifier 136 to the primary winding of a transformer 137, one terminal of which is connected to two diode detectors 138 and 139. These are connected oppositely so that the D. C. potential developed across resistor 140 is positive at terminal 141 whereas the D. C. potential developed across resistor 142 at terminal 143 is negative. The D. C. potential developed across resistor 140 is in series with and equal and opposite to the D. C. potential component developed across load resistor 143 by the rectified input signal through diode 131; and the D. C. potential developed across resistor 142 is in series with and equal and opposite to the D. C. potential component developed across load resistor 144 by the rectified input signal through diode 130. Consequently, all grid bias variations of tubes 134 and 135, resulting from incoming signal strength variations, are cancelled out, and the only remaining grid bias is the previously mentioned —12 volts indicated at terminal 145.

The cathodes of tubes 134 and 135 are each normally at ground potential. The voltage at terminal 146 is a cosine wave conforming to one half of the envelope of Fig. 5. This is depicted at 147. The voltage at terminal 148 is a cosine wave 180° out of phase with wave 147 and conforms to the other half of the envelope of Fig. 5.

Conductor 149 extends to the horizontal deflection amplifier 150 and includes, in series, two resistors 151 and 152. A shunt filter condenser 153 forms a bypass to ground for any residue of 2250 cycle current which may be present.

Also connected to conductor 149 is a selector switch 154 which is operative to connect in circuit any one of a plurality of capacitors 156— three of which are shown. These have different individual capacities, and the purpose of providing a plurality of them is to enable varying the rate at which the capacitor charge will build up to a given voltage. These capacitors operating in conjunction with resistor 152 and triodes 157 and 158 constitute the generator which produces the sawtooth voltage illustrated in Fig. 10. The several resistor-capacitor combinations, 152, 156 etc., including those hereinafter referred to, are called sweep circuits and are so denominated on the block diagram, Fig. 2.

The filter shown at 159 performs the same function as the filter comprising resistor 151 and condenser 153, except that it operates on the cosine wave depicted at 160—which is 180° out of phase, but is otherwise identical with the cosine wave depicted at 147. Similarly, the selector switch shown at 161 corresponds to selector switch 154; and the resistor-capacitor combination 162, 163 corresponds to the resistor-capacitor combination 152, 156. Likewise, triodes 164 and 165 are counterparts of triodes 157 and 158. Therefore, the description to follow concerning the generation of one set of sawtooth voltages for actuating horizontal deflection amplifier 150 will be understood to be applicable to the generation of the sawtooth voltages for actuating horizontal deflection amplifier 166. But before proceeding further, it should be made clear that the sawtooth voltage output of amplifier 150 is connected across only one of the two deflecting coils 18, 19, while the sawtooth voltage output of deflection amplifier 166 is connected across only the other of said two coils. It will be remembered that coils 18 and 19 are the horizontal deflection coils; and while these are shown connected in series in Figs. 7 and 9 (which was done to simplify the previously included description of the P. P. I. tube), it is to be understood that in this particular system the deflection coils are driven push-pull—wherefore the two deflection coils constituting each pair are separately connected to the outputs of their respective deflection amplifiers. It is not essential that these coils be operated push-pull but it is advantageous to do so.

Tubes 157 and 158 (also 164 and 165 as well as 187 to 190 inclusive, to be decribed later) are known as clamping tubes. These are so biased as to be normally conductive. Hence, capacitor 156 and its counterpart 163 are normally short-circuited through the clamping tubes and cannot build up charges from the cosine voltages 147 and 160. But the grids of said clamping tubes are connected via condensers 167 and 168 to conductor 108, and whenever a negative timing pulse 109 is transmitted by the timing oscillator the potential of said grid is lowered below cut-off. Thereupon, capacitors 156 and 163 commence charging exponentially, and the direction of charge depends upon the contemporaneous polarity of the applied cosine charging voltage 147, 160. This results in building up, exponentially, across capacitor 156 (likewise capacitor 163) a voltage either positive or negative, which tends in magnitude toward the cosine voltage 147 or 160 which would obtain at the moment if capacitor 156 were fully charged. This charging voltage constitutes, in each case, the front or sloping side of one sawtooth pulse as depicted in Fig. 10. Capacitors 156 and 163 continue to charge for the duration of pulse 109 (which duration is a variable quantity under control of the operator) and are discharged rapidly, when, at the termination of the timing pulse, the grids of clamping tubes 157, 158, 164, 165 are restored to normal potential. Capacitor 156 discharges through either tube 157 or 158, depending upon the direction in which it is charged; and capacitor 163 is similarly discharged through tube 164 or 165. If, for instance, capacitor 156 is so charged that its upper terminal is positive it will discharge through clamping tube 158; otherwise through clamping tube 157. The rate at which capacitors 156 and 163 are charged depends upon their capacities as well as upon the values of resistors 152 and 162. It follows, then, that the rate at which the cathode beam is swept radially from the center of the P. P. I. screen toward the periphery thereof depends upon which of the capacitors are connected in circuit by selector switches 154 and 161. But since the beam must, in each instance, travel all the way from center to the periphery of the screen, it will be apparent that this can be done, with various radial sweep velocities only by varying the duration of the timing pulse 109. If, for example, it is required that the radial sweep of the cathode beam shall be slow, there will be selected capacitors 156 and 163 having, in conjunction with resistors 152, 162, relatively long time constants, and the duration of pulse 109 will be so adjusted that the cathode beam will sweep all the way to the periphery of the screen. That is to say, the cathode beam will sweep the entire radial distance, under the influence of a cosinusoidal sawtooth pulse alone, at those times when the cosinusoidal sawtooth voltages, Fig. 10, are of maximum amplitude. (It is necessary to mention parenthetically that the radial beam sweep is caused by the conjoint action of sinusoidal and cosinusoidal sawtooth voltages occurring simultaneously and that neither alone will cause a complete radial sweep except at voltage maxima.) On the other hand, if it is required that the radial sweep of the cathode beam shall be fast, there will be selected a resistor-capacitor combination having a shorter time constant and the time pulse 109 will be made of shorter duration, corresponding to the shorter time required for the beam to sweep from the center of the screen to the periphery. Selector switches 154 and 161 are preferably ganged together and are also preferably ganged with the control which regulates the duration of pulse 109. By way of anticipation it may be added that selector switches 181 and 182 are also preferably ganged with switches 154 and 161. The selected capacitor 156 is preferably identical with the contemporaneous capacitor 163.

With the arrangement so far described and without the influence of the vertical sinusoidal deflection voltage hereafter dealt with, the cathode beam would sweep radially in a single direction only, that is to say along one fixed path, and the extent of the sweep would vary cosinusoidally between zero and a maximum value equal to the distance from the center to the periphery of the P. P. I. screen.

Such a performance standing by itself would have no recognized utility; but by introducing, simultaneously, a sinusoidal vertical beam deflection the conjoint result is to cause the cathode beam to make a complete radial sweep in each instance, and in a direction which corresponds to the direction in which the spinner at the transmitting end is pointed. This follows from the fact that the sine wave is 90° phase displaced from the cosine wave and is, therefore, of maximum voltage when the cosine wave is of zero voltage.

The required sinusoidal voltage for producing the vertical sawtooth pulses depicted in Fig. 11, is derived from the 885 cycle sine-modulated wave. This is separated from the other two low frequency waves by tuned transformer 125 and is passed via amplifier 169 to the primary of a push-pull transformer 170 having two secondary windings 171, 172 which are connected in series, respectively, with two diode detectors 173, 174. These latter may be identical in all respects to the cosine detectors 130, 131 and are appropriately referred to as "sine detectors." The D. C. counteracting voltages developed across resistors 140 and 142 are connected in series opposition to the D. C. components developed across load resistors 175, 176 and serve to prevent grid bias variations in cathode follower tubes 177, 178, just as those variations are avoided on the grids of cathode followers 134, 135 as previously described. Cathode followers 177, 178 are identical with cathode followers 134, 135, but their outputs are sinusoidal, as indicated at 179, 180.

Selector switches 181 and 182 are identical with switches 154 and 161; and the sweep circuits comprising the resistor-capacitor combinations 183, 184 and 185, 186 correspond respectively to the sweep circuits comprising resistor-capacitor combinations 152, 156 and 162, 163. The pair of clamping tubes 187, 188 are identical with clamping tubes 157, 158 while clamping tubes 189, 190 are counterparts of clamping tubes 164, 165.

The two sinusoidal waves 179 and 180 serve to charge capacitors 184 and 186 respectively, to produce sawtooth voltages having a sinusoidal envelope as shown in Fig. 11. These sawtooth voltages are transmitted via conductors 191 and 192 to vertical deflection amplifiers 193 and 194, the outputs of which are impressed respectively upon the two vertical deflection coils 18 and 19.

Assuming that the spinner is continuously rotating, the combined effect of the sine and cosine sawtooth deflection voltages is to cause the trace of the cathode beam to sweep around the center of the screen in step with the spinner while at the same time the beam is sweeping the screen radially at a rapidly recurring rate. Thus the trace of the beam is caused to traverse the entire area of the screen during each complete revolution of the spinner; and all video signals which are received during each such scanning cycle produce indicia on the screen properly positioned in correspondence to the wave reflecting bodies which they represent.

In order to avoid distortion it is important to make sure that the sine and cosine deflecting voltages are equal or that appropriate compensations are made for any inequality which may obtain.

It will be self-evident to those who are skilled in the art that numerous modifications and alternative embodiments are possible and practicable within the purview of this invention, and its scope is not to be regarded as limited except by the terms of the appended claims.

We claim:

1. In a radar link system, a transmitter unit comprising radar equipment including a rotatable radar beam projector, a radio transmitter including a high frequency oscillation generator and means for radiating the output thereof, means for modulating the output of said generator in accordance with radar synchronizing pulses and radar video pulses from said radar equipment, three low frequency wave sources having different frequencies, means for modulating the output of one said low frequency wave sources in accordance with the sine of the angle of rotation of said projector, means for simultaneously modulating the output of a second of said low frequency wave sources in accordance with the cosine of said angle, the output of the third of said low frequency wave sources being unmodulated, and means for modulating the output of said high frequency generator in accordance with said unmodulated low frequency wave and also in accordance with both said modulated low frequency waves, and a receiver unit operative in cooperation with said transmitter unit and situated remotely therefrom, said receiver unit comprising means for demodulating high frequency waves from said transmitter to reproduce said synchronizing and video pulses and to reproduce said low frequency waves, filter means for separating said low frequency waves from each other and from said pulses, means for separately detecting said modulated low frequency waves to produce complementary sine and cosine waves each having a frequency equal to the frequency of rotation of said projector, means for separately detecting said unmodulated low frequency wave to produce direct current potential, means for utilizing said direct current potential for neutralizing direct current potential components of said sine and cosine waves, a sawtooth generator energized by said sine wave, a second sawtooth generator energized by said cosine wave, an oscilloscope having horizontal and vertical beam deflecting means, means for impressing the output of one of said sawtooth generators upon said horizontal deflecting means and means for impressing the output of the other sawtooth generator upon said vertical deflecting means.

2. The method of synchronizing the rotation of the cathode beam of a position-plan-indicator tube with the rotation of a radar beam projector, where said projector and tube are located, respectively, at a transmitting station and a receiving station which are remotely spaced, said method comprising the following steps: (1) generating at the transmitting station a high frequency wave and three low frequency waves having different frequencies, (2) modulating one of said low frequency waves in accordance with the sine of the angle of rotation of said projector and simultaneously modulating another of said low frequency waves in accordance with the cosine of the angle of rotation of said projector, (3) modulating said high frequency wave with the two modulated low frequency waves and also with the unmodulated low frequency wave, (4) propagating the modulated high frequency wave into space, (5) detecting the modulated high frequency wave at the receiving station to reproduce the two modulated low frequency waves and the unmodulated low frequency wave, (6) separating the three low frequency waves, (7) separately detecting each of the low frequency waves to produce complementary sine and cosine waves which are in synchronism with the rotation of said projector and to produce direct current potential, (8) neutralizing the direct current components of said sine and cosine waves with said direct current potential, (9) generating a pair of sawtooth waves under the control, respectively, of said sine and cosine waves, and (10) energizing the horizontal and vertical beam deflecting elements of said position-plan indicator tube with said sawtooth waves.

3. The method of controlling the position of rotation of a follower in accordance with the angle of rotation of a rotor, where said rotor and follower are remotely spaced, said method comprising the following steps: (1) generating three low frequency waves having different frequencies, (2) modulating one of said low frequency waves in accordance with the sine of the angle of rotation of said rotor and simultaneously modulating another of said low frequency waves in accordance with the cosine of the angle of rotation of said rotor, (3) reproducing the two modulated low frequency waves and the unmodulated low frequency wave, (4) detecting each of the low frequency waves to produce complementary sine and cosine waves having direct current components, which sine and cosine waves are in synchronism with the rotation of said rotor, and to produce direct current potential from the unmodulated wave, (5) neutralizing the direct current components of said sine and cosine waves with said direct current potential, and (6) controlling the rotary position of said follower in accordance with the variations in said sine and cosine waves.

4. The method which comprises modulating an alternating current wave in accordance with a signal wave, modulating a high frequency carrier wave with said modulated alternating current wave and also with an unmodulated alternating current wave having a different frequency than that of said first-mentioned alternating current wave, propagating the modulated high frequency carrier wave through space, receiving said high frequency carrier wave, detecting said high frequency carrier wave to reproduce said modulated and unmodulated alternating current waves, detecting the reproduced modulated alternating current wave to produce a wave comprising said signal wave and a direct current component, rectifying the reproduced unmodulated alternating current wave to produce direct current potential, and neutralizing said direct current component with said direct current potential.

5. In a radio link system, a rotating device, a radio transmitter including a high frequency oscillation generator and means for radiating said high frequency oscillation into space, means in said transmitter for generating three alternating current waves of different frequencies and each of lower frequency than that of said oscillation generator, means in said transmitter for modulating the first of said alternating current waves in accordance with a sine wave synchronously with the rotation of said rotating device and for simultaneously modulating the second of said alternating current waves in accordance with the complementary cosine wave, means for modulating said high frequency oscillation in accordance with both said modulated alternating current waves and with the third, unmodulated alternating current wave; and a radio receiver responsive to said high frequency oscillation, said receiver having means operative to demodulate said high frequency oscillation whereby to reproduce the two sine and cosine modulated alternating current waves and the unmodulated alternating current wave, means for demodulating said modulated alternating current waves whereby to reproduce the aforesaid sine and cosine waves and their respective direct current components, means for rectifying said unmodulated alternating current wave to produce a direct current potential, a rotating device controllably associated with said receiver, means for utilizing said reproduced sine and cosine waves to maintain synchronism between said last-named rotating device and the first-named rotating device, and means in said receiver for utilizing said direct current potential to neutralize said direct current components of said sine and cosine waves.

6. In a radio link system, a radio transmitter including a high frequency wave generator and a sub-carrier frequency wave generator and means for radiating into space the output of said high frequency wave generator, means for generating two alternating current waves of different frequencies and each of lower frequency than that of said sub-carrier wave generator, means for modulating one of said alternating current waves in accordance with a sine wave and simultaneously modulating the other of said alternating current waves in accordance with the complementary cosine wave, means for modulating the output of said sub-carrier wave generator in accordance with both said modulated alternating current waves, means for additionally modulating said sub-carrier wave in accordance with an unmodulated alternating current wave having a frequency differing from that of each of the two modulated alternating current waves and of lower frequency than of said sub-carrier wave, means for modulating the output of said high frequency wave generator in accordance with said modulated sub-carrier wave; a radio receiver responsive to said radio transmitter and having means operative to demodulate the high frequency wave received therefrom whereby to reproduce the modulated sub-carrier wave, selective means operative to separate the sub-carrier wave from other intelligence included in the modulation of said high frequency wave, means operative to demodulate said sub-carrier wave whereby to reproduce said two modulated alternating current waves and said unmodulated alternating current wave, additional means for demodulating said two modulated waves whereby to reproduce the aforesaid sine and cosine waves and undesired direct current components, means for rectifying said unmodulated alternating current wave to produce direct current potential, means for utilizing said direct current potential to neutralize said undesired direct current components, and means for utilizing said sine and cosine waves for maintaining synchronism between a first device located at the transmitter and a second device located at the receiver, said sine and cosine waves being generated at the transmitter in synchronism with the operation of said first device.

DAVID B. SMITH
RICHARD G. CLAPP.
ANDREW P. MONTGOMERY.
KENNETH H. EMERSON.
Dr BREMOND B. HOFFMAN.

REFERENCES CITED

The following references are of record in the file of this patent:

UNITED STATES PATENTS

| Number | Name | Date |
| --- | --- | --- |
| 1,941,615 | Mirick | Jan. 2, 1934 |
| 2,014,518 | Beverage | Sept. 17, 1935 |
| 2,049,424 | Cooley | Aug. 4, 1936 |
| 2,233,183 | Roder | Feb. 25, 1941 |
| 2,256,487 | Moseley | Sept. 23, 1941 |
| 2,298,409 | Peterson | Oct. 13, 1942 |
| 2,363,941 | Busignies | Nov. 28, 1944 |
| 2,396,091 | De Bey | Mar. 5, 1946 |
| 2,400,791 | Tolson | May 21, 1946 |
| 2,402,459 | Smith | June 18, 1946 |
| 2,408,692 | Shore | Oct. 1, 1946 |
| 2,412,669 | Bedford | Dec. 17, 1946 |